(12) United States Patent
Kinzinger

(10) Patent No.: US 11,042,376 B2
(45) Date of Patent: Jun. 22, 2021

(54) METHOD OF ALLOCATING A VIRTUAL REGISTER STACK IN A STACK MACHINE

(71) Applicant: Kinzinger Automation GmbH, Rastatt (DE)

(72) Inventor: Klaus Kinzinger, Rastatt (DE)

(73) Assignee: Kinzinger Automation GmbH

( * ) Notice: Subject to any disclaimer, the term of this patent is extended or adjusted under 35 U.S.C. 154(b) by 73 days.

(21) Appl. No.: 16/079,628

(22) PCT Filed: Feb. 27, 2017

(86) PCT No.: PCT/EP2017/054532
§ 371 (c)(1),
(2) Date: Aug. 24, 2018

(87) PCT Pub. No.: WO2017/144728
PCT Pub. Date: Aug. 31, 2017

(65) Prior Publication Data
US 2019/0065198 A1 Feb. 28, 2019

Related U.S. Application Data

(63) Continuation of application No. PCT/EP2016/000345, filed on Feb. 27, 2016, and a continuation of application No. PCT/EP2016/000344, filed on Feb. 27, 2016.

(51) Int. Cl.
*G06F 9/30* (2018.01)
*G06F 9/35* (2018.01)
*G06F 12/0875* (2016.01)

(52) U.S. Cl.
CPC ...... *G06F 9/30134* (2013.01); *G06F 9/30101* (2013.01); *G06F 9/35* (2013.01); *G06F 12/0875* (2013.01); *G06F 2212/451* (2013.01)

(58) Field of Classification Search
None
See application file for complete search history.

(56) References Cited

U.S. PATENT DOCUMENTS

| | | |
|---|---|---|
| 4,525,780 A | 6/1985 | Bratt et al. |
| 4,575,795 A | 3/1986 | Boothroyd et al. |
| 5,107,457 A | 4/1992 | Hayes et al. |

(Continued)

FOREIGN PATENT DOCUMENTS

| | | |
|---|---|---|
| EP | 0676691 A2 | 10/1995 |
| EP | 0793179 A2 | 9/1997 |

(Continued)

OTHER PUBLICATIONS

International Search Report and Written Opinion for PCT/EP2017/054532 dated May 18, 2017.

(Continued)

*Primary Examiner* — Michael Sun
(74) *Attorney, Agent, or Firm* — Hansen IP Law PLLC

(57) ABSTRACT

A method of allocating a virtual register stack (10) of a processing unit in a stack machine is provided. The method comprises allocating a given number of topmost elements (11) of the virtual register stack (10) in a physical register file (17) of the stack machine and allocating subsequent elements of the virtual register stack (10) in a hierarchical register cache (13) of the stack machine.

15 Claims, 4 Drawing Sheets

(56) References Cited

U.S. PATENT DOCUMENTS

| | | | |
|---|---|---|---|
| 5,280,614 A | 1/1994 | Munroe et al. | |
| 5,325,496 A | 6/1994 | Hays et al. | |
| 5,509,131 A | 4/1996 | Smith et al. | |
| 5,564,031 A * | 10/1996 | Amerson | G06F 7/72 |
| | | | 711/110 |
| 5,644,709 A | 7/1997 | Austin | |
| 5,852,726 A * | 12/1998 | Lin | G06F 9/30109 |
| | | | 712/200 |
| 58,550,101 | 12/1998 | Wavish | |
| 6,035,391 A * | 3/2000 | Isaman | G06F 9/30032 |
| | | | 712/222 |
| 6,574,721 B1 | 6/2003 | Christenson et al. | |
| 6,886,085 B1 | 4/2005 | Shuf et al. | |
| 8,996,807 B2 * | 3/2015 | Joshi | G06F 9/45558 |
| | | | 711/117 |
| 9,032,174 B2 | 5/2015 | Nishiguchi | |
| 9,798,873 B2 | 10/2017 | Glew et al. | |
| 10,146,707 B2 | 12/2018 | Kawai et al. | |
| 2001/0044891 A1 | 11/2001 | McGrath et al. | |
| 2002/0144091 A1 * | 10/2002 | Widigen | G06F 9/3836 |
| | | | 712/217 |
| 2003/0037037 A1 | 2/2003 | Adams et al. | |
| 2003/0065929 A1 | 4/2003 | Milliken | |
| 2003/0154363 A1 * | 8/2003 | Soltis, Jr. | G06F 9/462 |
| | | | 712/217 |
| 2004/0003208 A1 * | 1/2004 | Damron | G06F 9/30032 |
| | | | 712/225 |
| 2004/0015876 A1 | 1/2004 | Applin | |
| 2005/0102494 A1 * | 5/2005 | Grochowski | G06F 9/3017 |
| | | | 712/228 |
| 2005/0108497 A1 | 5/2005 | Bridges et al. | |
| 2005/0257051 A1 | 11/2005 | Richard | |
| 2006/0020946 A1 | 1/2006 | Alexander et al. | |
| 2007/0106885 A1 * | 5/2007 | Rychlik | G06F 9/30123 |
| | | | 712/228 |
| 2008/0104325 A1 | 5/2008 | Narad | |
| 2008/0222397 A1 | 9/2008 | Wilkerson et al. | |
| 2010/0161948 A1 * | 6/2010 | Abdallah | G06F 9/30043 |
| | | | 712/228 |
| 2014/0281398 A1 | 9/2014 | Rash et al. | |
| 2015/0293767 A1 | 10/2015 | Michishita et al. | |
| 2018/0004678 A1 | 1/2018 | Bogusz et al. | |

FOREIGN PATENT DOCUMENTS

| | | |
|---|---|---|
| EP | 1764682 A2 | 3/2007 |
| EP | 2211285 A1 | 7/2010 |
| WO | 1981002477 A1 | 9/1981 |
| WO | 2007048128 A2 | 4/2007 |

OTHER PUBLICATIONS

Hand, Tom, "The Harris RTX 2000 Microcontroller", Journal of Forth Application and Research, (1990), vol. 6.1, pp. 5-13.

Wichtel et al.: "Mondrix: Memory Isolation for Linux Using Mondriaan Memory Protection", SOSP'05, Oct. 23-26, 2005, Brighton, United Kingdom, Oct. 23, 2005 (Oct. 23, 2005),—Oct. 26, 2005 (Oct. 26, 2005), pp. 31-44, XP040029779, ACM, 2 Penn Plaza, Suite701—New York USA.

International Search Report and Written Opinion for PCT/EP2017/054535 dated May 31, 2017.

* cited by examiner

FIG 4

METHOD OF ALLOCATING A VIRTUAL REGISTER STACK IN A STACK MACHINE

TECHNICAL FIELD

The invention relates to a method of allocating a virtual register stack in a stack machine as well as to a corresponding stack machine, computer program, data carrier, and data structure.

BACKGROUND ART

In computer science, computer engineering, and programming language implementations, by stack machine is meant a type of processor whose instructions operate on a push-down stack rather than on registers. Conventional stack machines typically have a stack of unlimited size and are either implemented in silicon or simulated by software on a standard register machine. As most machine instruction set architectures (ISAs) define only a finite number of so-called architected registers, conventional stack machines suffer performance penalties resulting from inefficient stack-register mapping. Stack-oriented programming languages such as Forth, RPL, and various assembly languages rely heavily on such stack machine implementations.

A known silicon-based stack machine implementation has been disclosed in Hand, Tom. "The Harris RTX 2000 Microcontroller." *Journal of Forth Application and Research* 6.1 (1990): 5-13. For a discussion of register allocation methods for software-simulated stack machines within the context of compiler design, see SHANNON, Mark; BAILEY, Chris. Global Stack Allocation-Register Allocation for Stack Machines. In: *Proceedings of the Euroforth Conference*. 2006.

SUMMARY OF INVENTION

The invention as claimed is hereinafter disclosed in such a way that the technical problem with which it deals can be appreciated and the solution can be understood.

Technical Problem

The problem to be solved is to seek an alternative to known instruction set architectures which provides the same or similar effects or is more cost-effective.

Solution to Problem

To elucidate the nature of the solution, reference is made to the characterizing portion of the independent claims.

Advantageous Effect of Invention

The invention gives rise to efficient data processing, efficient data storage, and enhanced security.

BRIEF DESCRIPTION OF DRAWINGS

FIG. 4 shows a more complex instance of the same use case.

DESCRIPTION OF EMBODIMENTS

The invention introduces an abstraction of the processor-specifically architected and named general-purpose registers that are key design elements of all known state-of-the-art processors and ISAs. (These general-purpose registers hereinafter will be plainly referred to as "registers" and distinguished from special-purpose registers that hold program state such as a stack pointer or correspond to specialized hardware elements.) To this end, an embodiment creates a universally abstract type of register which is declared in a virtual register space and addressed by ISA opcodes by means of virtual addresses (as opposed to state-of-the-art individual "register names"). Within this meaning, the invention defines a stack machine comprising a fully addressable virtual register stack and ISA.

Figure 1:
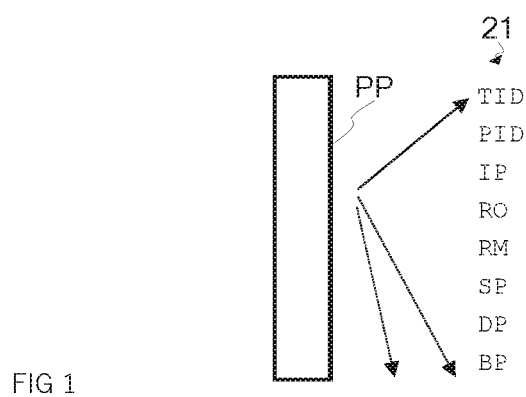
FIG. 1 shows the process management of a processing unit.

As FIG. 1 illustrates, each process running on this stack machine at least temporally has its own processing unit with a set of private special-purpose registers (21) that are managed by hardware and essentially inaccessible to application software. These special-purpose register sets (21) are selected by means of a process pointer (PP). Specifically, the special purpose register set of the present embodiment may comprise, inter alia, a unique task identifier (TID), process identifier (PID), instruction pointer (IP), register offsets (RO), register bitmasks (RB), virtual register stack pointer (SP), data stack pointer (DP), and return stack pointer (BP). At any point in time, the processing unit may be either active, that is, loaded, or inactive, that is, unloaded to any distinct level of the memory hierarchy.

Figure 2:
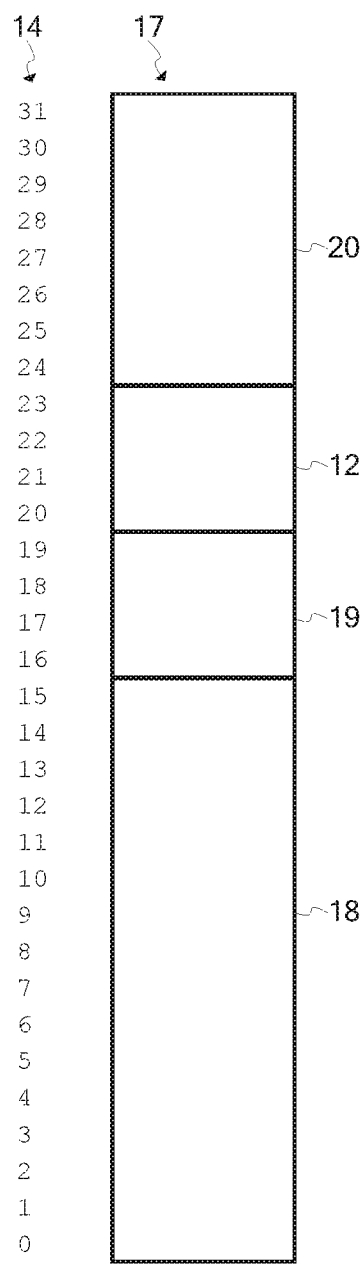
FIG. 2 shows a register file.

FIG. 2 elucidates the machine's physical register file (17), whose actual size is a scalable design parameter. As may be gathered from the block schematic, the register file (17) exhibits a data structure composed of multiple segments, each of which contains the physical registers of a specific— in the present example, "virtual"—processing unit. For any such unit, the bitmask (RB) and offset (RO) mentioned regarding FIG. 1 define the number and position, respectively, of its registers within the register file (17). To this end, each register is uniquely addressable by a zero-based register number (14). As an example, consider that segment (12) which contains the four registers numbered as 20, 21, 22, and 23. When these registers are allocated in a virtual processing unit, the latter's bitmask (RB) would be set to $00011_2 = 3_{10}$ and its offset (RO) to $10100_2 = 20_{10}$.

Figure 4:
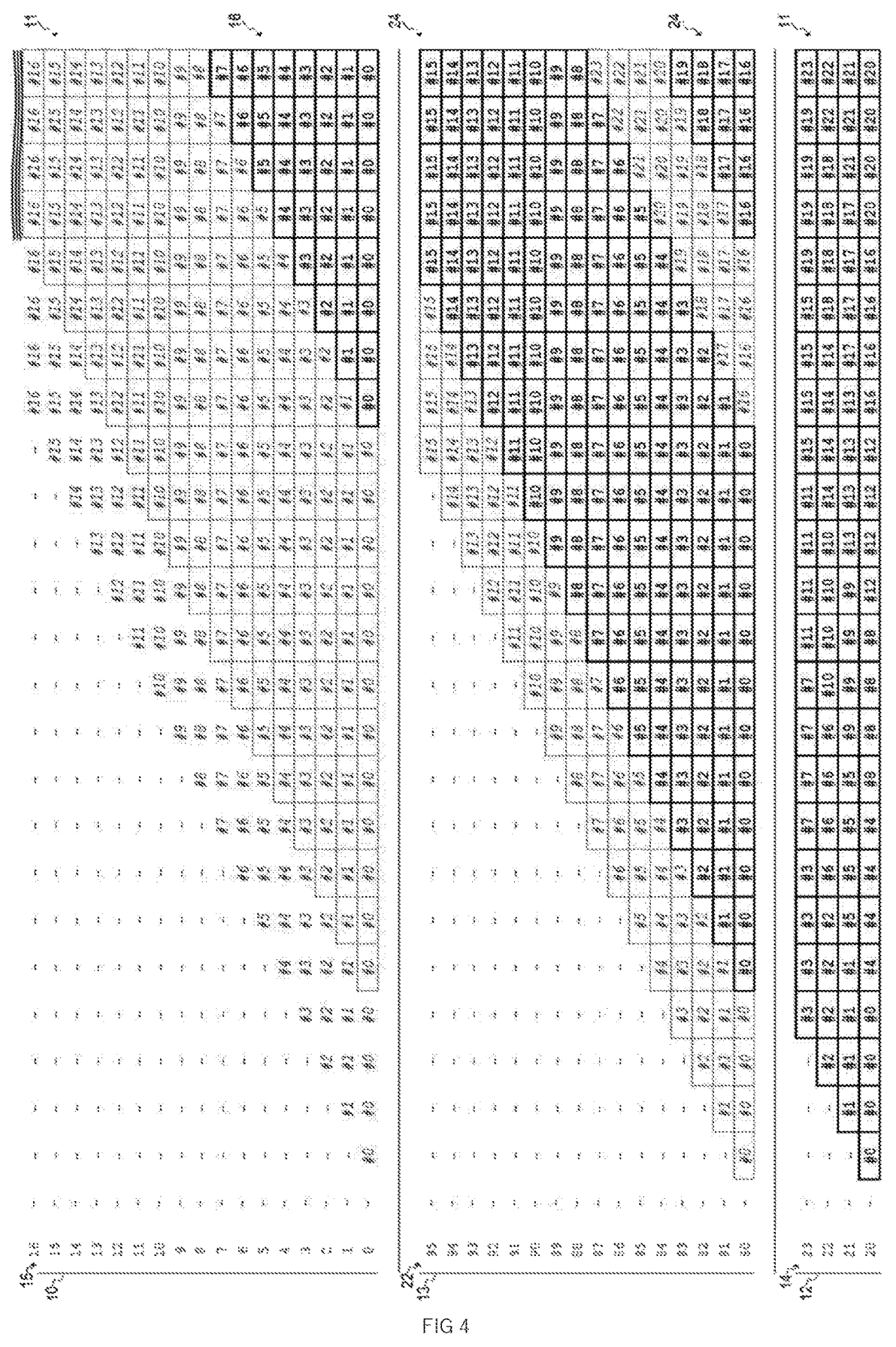

The overall memory organization scheme of FIG. 2 also applies to higher levels of the memory hierarchy, as depicted in FIG. 4 for a single process.

Figure 3:
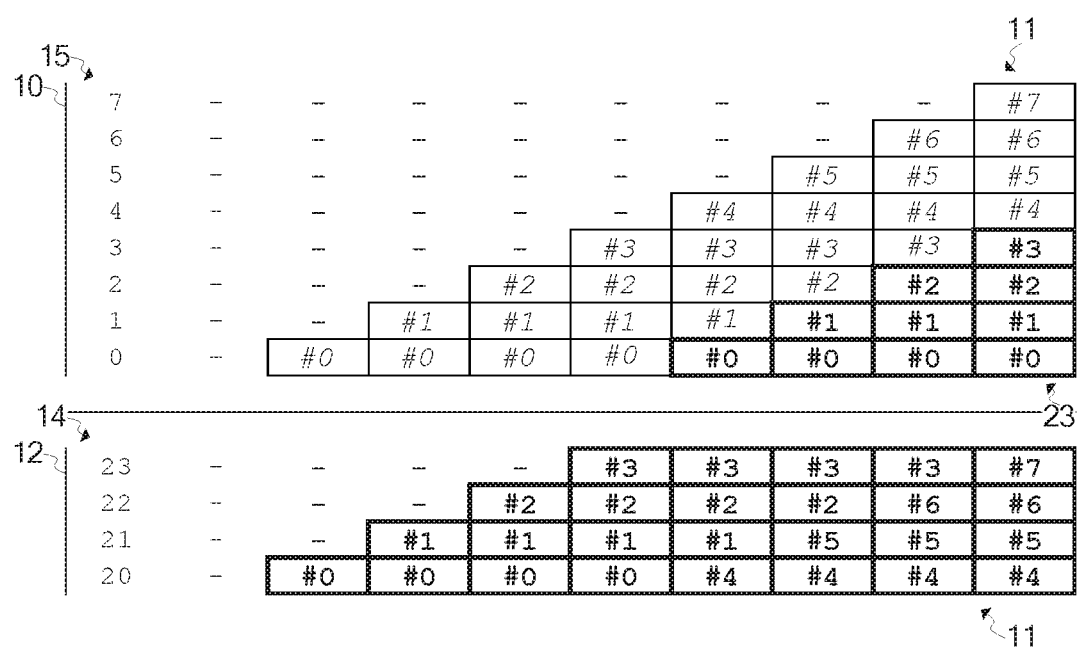
FIG. 3 shows a simple example of a virtual register stack growing element by element.

FIG. 3 exemplifies a continuous growth of said virtual processing unit's virtual register stack (10), which contains call and return as well as local subroutine variables to be used as addressable operands.

Considering the number of physical registers of that unit, the topmost elements (11)—in this case, a maximum of four such elements at any given time—of the virtual register stack (10) are allocated in the corresponding segment (12) of the register file (17—FIG. 2), whereas all subsequent elements (23) are "spilled". i. e. allocated in random-access memory. Push and pop operations on said virtual register stack—resulting in its growing and shrinking—are implicitly triggered by most ISA opcodes, i. e. software, and accordingly executed by hardware. Thereby, any data transfer between the register file segment (12) and its connected random-access memory segment (10) is automatically executed in compliance with a lazy store and load policy, meaning that register spill and fill is hardware-automatic and only executed when necessary, thereby avoiding redundant store operations (lazy store) and "dummy load" operations of data values that are not—or not yet—needed by the program (lazy load).

Each element of the virtual register stack (10) is uniquely addressable by a zero-based index (15). To physically allocate that element, its respective index (15) is mapped by bitwise logical conjunction—an operation referred to in the art as "bit-masking"—with the unit's bitmask (RB) before undergoing bitwise logical disjunction with its offset (RO). Per this mechanism, for instance, the index $7_{10}=00111_2$ would be mapped to physical register $(00111_2$ AND $00011_2)$ OR $10100_2=00011_2$ OR $10100_2=10111_2=23_{10}$.

Consequently, the virtual register #7 addressed by this index is allocated in physical register #23. It is to be noted however that there is by no means a one-to-one correspondence between virtual and physical registers throughout the entire runtime of a process, as physical register #23 had previously been used to store virtual register #3 and—in future cycles beyond the scope of FIG. 3—may well store virtual registers #11, #15, #19 and so forth without departing from the invention. Note also that if several virtual registers compete for allocation in a physical register the one with the highest index (11) wins; the rest is spilled to random-access memory (23). Note as well that in this context, the inclusive disjunction or alternation employed above yields the same result as the exclusive disjunction XOR.

This approach bears the advantage that the respective segment (12) of the register file (17) is organized like a ring buffer, sometimes referred to as a circular buffer, circular queue, or cyclic buffer. Hence, there is no need to shift or shuffle the contents of the segment (12) when elements are pushed onto or popped from the virtual register stack (10). Further, virtual registers located near the stack-top—which are likely to be accessed as operands by the machine's arithmetic logic unit—tend to be stored in the readily accessible register file (17) as opposed to slower and less energy-efficient cache or even off-chip memory. The stack machine invented here thus exhibits an overall improved energy efficiency and performance that renders it suitable even for hard real-time applications. In use cases that impose less stringent restrictions, an embodiment of the invention still allows for reduced energy consumption as smaller register files are required to meet the same runtime objectives.

The overall memory organization and data handling scheme of FIG. 3 also applies to higher levels of the memory hierarchy, as depicted in FIG. 4 for a single process. In addition to the virtual register stack (10), random-access memory (23), and register file segment (12) of FIG. 3, the augmented scenario of FIG. 4 introduces a first level of a register cache hierarchy (13) in which additional elements of the virtual register stack (10) are allocated that cannot be accommodated by segment (12). While such hierarchy (13) may comprise cascaded storage media of various types such as register file, on-chip or off-chip random-access memory, or file, these media will hereinafter be referred to collectively as a hierarchical register cache (13), the term "cache" being applied in a broad meaning.

Each level of the cache hierarchy (13) further partly serves as backup for all lower levels of said cache hierarchy including "cache level 0", meaning the register file (17) itself. In this respect, the pertinent memory locations (24) constitute a dual use shadow buffer which under steady-state process runtime conditions is used for lazy store and load operations and during process unload from its virtual processing unit is reused as a backup storage medium retaining the virtual registers evicted from the lower levels of the cache hierarchy whereas upon process reload said virtual registers in said lower levels of the cache hierarchy are restored from said backup storage medium. Note that process unload and the associated reload may be partial, meaning that not all lower levels of the register cache hierarchy need to be evicted and restored thereby allowing for runtime performance against memory use tradeoffs during process switches.

Note also that with exception of the highest level of a given cache hierarchy scheme each lower cache level—including "cache level 0", register file—may hold zero virtual registers (11). As a consequence, any process may—but need not to—own a segment (12) of the register file which permits access to high performance features like parallel multiport access of e. g. multiple arithmetic logic units to the virtual register stack and associated ILP (instruction level parallelism). According to the invention, processes hence can be precisely fine-tuned to their respective register performance requirements, and it is even possible to build stack machines for low-end microcontroller applications that have no register file at all.

At application software level, only the boundless virtual register space common to all embodiments of the invention is visible while the details of the allocation of the virtual registers in the hardware may vary from processor type to type, from special register setup to setup, and even during program runtime without any effect or influence to the application software layer. In this meaning, application software can be compiled in hardware-abstract form directly to what in compiler technology is called a LLVM (Low Level Virtual Machine), thereby strictly decoupling a purely algorithmic software domain from its physical hardware implementation and configuration domain.

Said LLVM approach bears the advantage that an universal interface between computer software and hardware can be constructed defined by a virtual instruction set architecture (VISA) that is common to the whole computer class defined by the invention in such a way that a program written for any embodiment of said class by principle will run on any other embodiment of said class, not only with respect to hardware manufacturer, performance class, and application type (software portability) but also with respect to time (software persistence), as hardware technologies may be new, further developed, changed, improved, or abandoned without having the side-effect of rendering software written for an earlier technology grade of said computer class obsolete (software backward and forward compatibility).

INDUSTRIAL APPLICABILITY

The invention may be applied, inter alia, throughout the semiconductor industry.

The invention claimed is:

1. A method of allocating a virtual register stack (10) of a processing unit in a stack machine comprising:
   allocating a given number of topmost elements (11) of the virtual register stack (10) in a physical register file (17) of the stack machine; and
   allocating additional elements of the virtual register stack (10) in a hierarchical register cache (13) of the stack machine.

2. The method of claim 1 wherein the register file (17) comprises multiple registers, each register being uniquely addressable by a zero-based register number (14), each element of the virtual register stack (10) is uniquely addressable by a zero-based index (15), and, to allocate an element among the topmost elements (11), the index (15) by which that element is addressable is mapped to a register number (14) among the register numbers (14).

3. The method of claim 2 wherein the index (15) is mapped by bitwise logical conjunction with a bitmask (RB) corresponding to a given capacity of registers of the processing unit within the register file (17), the conjunction being followed by bitwise logical disjunction with an offset (RO) of the registers within the register file (17).

4. The method of claim 3 wherein, if the capacity of registers is exhausted, any remaining elements of the virtual register stack (10) are spilled to the hierarchical register cache (13).

5. The method of claim 3 wherein the processing unit is virtual and the registers are contained in a segment (12) of the register file (17) defined by special-purpose registers (21) of the virtual processing unit, the special-purpose registers (21) comprising the bitmask (RB) and the offset (RO).

6. The method of claim 5 comprising: managing the special-purpose registers (21) by means of a process pointer (PP) referencing the virtual processing unit, the special purpose registers (21) preferably comprising a unique task identifier (TID), process identifier (PID), instruction pointer (IP), virtual register stack pointer (SP), data stack pointer (DP), and return stack pointer (BP).

7. The method of claim 5 comprising, upon activation, allocating the segment (12) within the register file (17) and loading the virtual processing unit and, upon deactivation, unloading the virtual processing unit and releasing the segment (12).

8. The method of claim 1 wherein the topmost elements (11) are further backed up to the register cache (13).

9. The method of claim 8 wherein the register cache (13) comprises multiple registers, each register being uniquely addressable by a zero-based address (22), and, to allocate an element among the subsequent elements, the index (15) by which that element is addressable is mapped to the respective address (22).

10. The method of claim 9 wherein the index (15) is mapped by bitwise logical conjunction with a bitmask (RB) corresponding to a capacity of the register cache (13), the conjunction being followed by bitwise logical disjunction with an offset (RO) within the register cache (13).

11. The method of claim 10 wherein, if the capacity of the register cache (13) is exhausted, any remaining bottommost elements (16) of the virtual register stack (10) are spilled to a random-access memory.

12. A stack machine being adapted to execute the steps of the method of claim 1.

13. A non-transitory computer readable medium comprising instructions stored thereon, wherein when executed by a processor, the instructions cause a stack machine to execute the steps of the method of claim 1.

14. A computer-implemented data structure (17) for use in the method of claim 1, comprising:
multiple segments (12, 18, 19, 20), each segment (12, 18, 19, 20) containing a given number of registers of a virtual processing unit and being defined by special-purpose registers (21) of the virtual processing unit, the special-purpose registers (21) comprising an offset (RO) of the registers within the structure (17).

15. The data structure (17) of claim 14 wherein the number of registers is a power of two, the special-purpose registers (21) of the virtual processing unit further comprising a bitmask (RB) corresponding to the number of registers.

* * * * *